W. CAHILL.
Kneeling-Stool.
No. 6,561. Reissued July 27, 1875.
Fig. I.
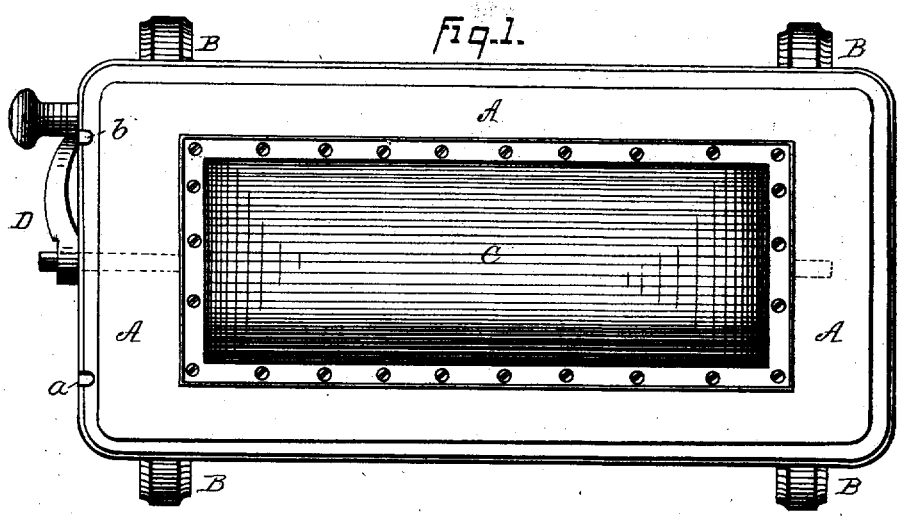
Fig. II.
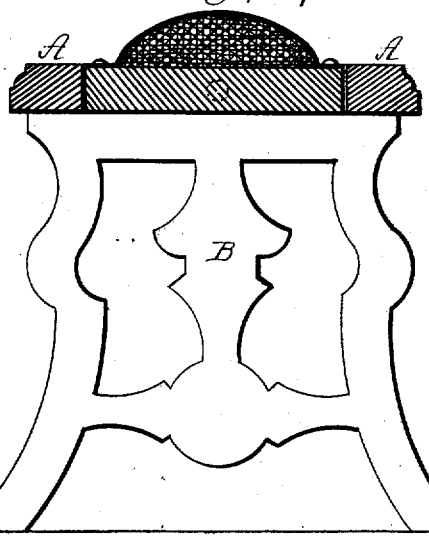
Fig. III.
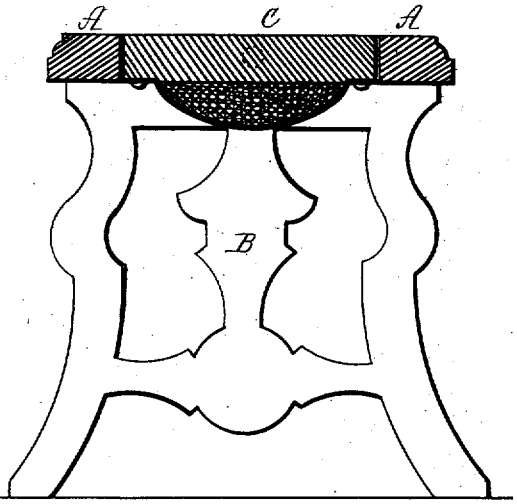
WITNESSES:
Jas. E. Hutchinson
Jos. L. Coombs
INVENTOR.
William Cahill.
By James L. Norris.
Atty.
N. PETERS, PHOTO-LITHOGRAPHER, WASHINGTON, D. C.

UNITED STATES PATENT OFFICE.

WILLIAM CAHILL, OF SYRACUSE, NEW YORK.

IMPROVEMENT IN KNEELING-STOOLS.

Specification forming part of Letters Patent No. 155,706, dated October 6, 1874; reissue No. 6,561, dated July 27, 1875; application filed January 9, 1875.

*To all whom it may concern:*

Be it known that I, WILLIAM CAHILL, of Syracuse, in the county of Onondaga and State of New York, have invented certain new and useful Improvements in Reversible Kneeling or Foot Benches, of which the following is a specification:

My invention relates to a new and improved footstool or bench for use in pews of churches, and other places; and it consists of a horizontal frame supported upon legs or standards at each end, having a reversible top hung upon pivots within it in such a manner that either side of same may be turned up, one side being cushioned for the knees to rest upon, and the other plain to receive the feet. The invention further consists in a horizontal frame having a reversible seat pivoted or journaled thereon, in combination with a locking lever or arm applied to one of the journals of the reversible seat for securing the same in a firm position when adjusted, as hereinafter described.

My invention is designed principally for use in churches, being placed in the pews, and serving as a footstool or kneeling-stool, as may be desired. With the plain side of the top upward it furnishes a durable footstool; with the cushioned side upward it forms a comfortable kneeling-stool.

Referring to the drawings, Figure 1 represents a top or plan view of my invention; Fig. 2, a transverse section, showing the cushion up; and Fig. 3 a transverse section, showing the cushion down.

A represents a horizontal frame, supported at each end upon upright standards or legs B B, of suitable height. C represents the seat, pivoted at each end within the frame A, in such a manner that it can be freely turned so as to present either side upward. One side of said top is cushioned, as shown, and the other left plain, so that the person before whom it is placed can have a plain footstool, or a cushioned kneeling-stool, as may be desired. One of the journals or pivots of the reversible seat is extended beyond the main frame, and its projecting end is provided with a crank, D, having a lateral pin, *b*, adapted to a recess, *a*, near each edge of the frame, as shown in Fig. 1.

By this means the crank can be used to turn either the cushioned or plain side of the top up, and the top can then be secured in a horizontal position by placing the lateral pin on the crank into one of the recesses in the edge of the frame.

In this manner, when the frame is extended and provided with a series of the reversible tops, the entire series can be operated by the crank, and all secured in a firm horizontal position, as before stated.

This method is specially intended for stores, where the stool, or series of stools, is intended to be used as a settee.

I also propose to employ the reversible seat, and its principle, in carriage-seats, especially open buggies, the cushions forming a seat during fair weather; but in rainy weather the frame will be reversed to expose the plain surface, and thus protect the cushion.

A footstool or kneeling-stool constructed in this manner is much more durable than the ordinary cushioned footstools heretofore used, and will always present a neat and elegant appearance, as the cushion is not liable to become soiled by the feet, and the plain side may be readily washed and cleaned.

Having thus described my invention, what I claim, and desire to secure by Letters Patent, is—

1. A portable footstool constructed substantially as herein shown and described—that is to say, with the top C having upon one side a plain uncushioned surface for the feet, and on the opposite side a cushioned surface for the knees, the said top being loosely pivoted within the surrounding frame A′, so as to oscillate therein to partake of the movements of the knees, as set forth.

2. The combination of the horizontal frame A, having notches *a*, of the reversible top C and the lever D, having projections *b*, substantially as and for the purpose described.

WILLIAM CAHILL.

Witnesses:

S. W. SHERLOCK,

JNO. B. SHERLOCK.